US012766894B2

(12) United States Patent
Mo et al.

(10) Patent No.: US 12,766,894 B2
(45) Date of Patent: Oct. 20, 2026

(54) TIRE PRESSURE ALARM METHOD AND APPARATUS, COMPUTER DEVICE, AND STORAGE MEDIUM

(71) Applicants: ZHEJIANG LIANKONG TECHNOLOGIES CO., LTD, Ningbo (CN); ZHEJIANG GEELY HOLDING GROUP CO., LTD, Hangzhou (CN)

(72) Inventors: Longgen Mo, Ningbo (CN); Zuguo Ma, Ningbo (CN); Zhenhai Zhong, Ningbo (CN); Yang Zhang, Ningbo (CN)

(73) Assignees: ZHEJIANG LIANKONG TECHNOLOGIES CO., LTD, Ningbo (CN); ZHEJIANG GEELY HOLDING GROUP CO., LTD, Hangzhou (CN)

( * ) Notice: Subject to any disclaimer, the term of this patent is extended or adjusted under 35 U.S.C. 154(b) by 0 days.

(21) Appl. No.: 18/986,740

(22) Filed: Dec. 19, 2024

(65) Prior Publication Data

US 2025/0121636 A1 Apr. 17, 2025

Related U.S. Application Data

(63) Continuation of application No. PCT/CN2023/107657, filed on Jul. 17, 2023.

(30) Foreign Application Priority Data

Aug. 29, 2022 (CN) ........................ 202211042599.6

(51) Int. Cl.
*B60C 23/06* (2006.01)
*B60C 23/04* (2006.01)
(Continued)

(52) U.S. Cl.
CPC ........ *B60C 23/064* (2013.01); *B60C 23/0405* (2013.01); *B60C 23/0408* (2013.01);
(Continued)

(58) Field of Classification Search
CPC .............. B60C 23/064; B60C 23/0405; B60C 23/0408; B60C 23/066; B60C 23/0403; G01B 17/02; G07C 5/0833
See application file for complete search history.

(56) References Cited

U.S. PATENT DOCUMENTS

| | | | | |
|---|---|---|---|---|
| 10,475,201 | B1 * | 11/2019 | Hall | G01B 11/105 |
| 11,840,241 | B1 * | 12/2023 | Barrett | B60W 40/101 |

(Continued)

FOREIGN PATENT DOCUMENTS

| | | | |
|---|---|---|---|
| CN | 103832223 | A | 6/2014 |
| CN | 105764714 | A | 7/2016 |

(Continued)

*Primary Examiner* — Sohana Tanju Khayer

(57) ABSTRACT

A tire pressure alarm method includes: obtaining a static load parameter and an actual tire pressure value of a tire; determining a safe tire pressure value based on the static load parameter, the actual tire pressure value, and a preset mapping relationship between the static load parameter, the actual tire pressure value, and the safe tire pressure value; and comparing the actual tire pressure value with the safe tire pressure value, and emitting an alarm signal if the actual tire pressure value is less than the safe tire pressure value.

8 Claims, 3 Drawing Sheets

(51) Int. Cl.
*G01B 17/02* (2006.01)
*G07C 5/08* (2006.01)

(52) U.S. Cl.
CPC ............ *B60C 23/066* (2013.01); *G01B 17/02* (2013.01); *G07C 5/0833* (2013.01); *B60C 23/0403* (2013.01)

(56) References Cited

U.S. PATENT DOCUMENTS

2003/0201880 A1* 10/2003 Lu ......................... B60C 23/066 340/443
2005/0172709 A1* 8/2005 Keller ................... B60C 23/061 73/146.3
2010/0182142 A1* 7/2010 Svedberg .............. B60C 23/062 340/442
2016/0185166 A1* 6/2016 Huang ................ B60C 23/0476 73/146.4
2016/0200155 A1* 7/2016 Steinmeyer ........... B60C 23/061 73/146.2
2019/0105953 A1* 4/2019 Zaroor ................ B60C 23/0474
2019/0152276 A1* 5/2019 Fu ....................... B60C 23/0474
2019/0161921 A1* 5/2019 Schwarting ........... B60C 23/001
2020/0238770 A1* 7/2020 Karlsson ............... B60C 23/061
2021/0347214 A1 11/2021 Suzuki et al.
2023/0417617 A1* 12/2023 Chalofsky ............. G01M 1/045
2025/0231021 A1* 7/2025 Tanabe ............... G01B 11/2522

FOREIGN PATENT DOCUMENTS

CN 109383202 A 2/2019
CN 115257249 A 11/2022
DE 102018002349 A1 9/2018
JP 2007240392 A 9/2007
JP 2015137851 A 7/2015
JP 2015536463 A 12/2015
KR 20070060913 A 6/2007
WO 2016203741 A1 12/2016

* cited by examiner

TIRE PRESSURE ALARM METHOD AND APPARATUS, COMPUTER DEVICE, AND STORAGE MEDIUM

CROSS REFERENCE TO RELATED APPLICATION

The present application is a continuation application of PCT Application No. PCT/CN2023/107657, filed on Jul. 17, 2023, which claims the benefit of priority to a Chinese Patent Application number CN202211042599.6, filed on Aug. 29, 2022, the disclosure of the above application is hereby incorporated by reference in its entirety for all purposes.

TECHNICAL FIELD

The present disclosure relates to the field of vehicle detection technologies, and in particular, to a tire pressure alarm method and apparatus, a computer device, and a storage medium.

BACKGROUND

Because a load-bearing capacity of a tire decreases as tire pressure decreases, currently, a tire pressure sensor is usually disposed on a tire of a vehicle to detect tire pressure, and a detected tire pressure value may be used for a tire pressure alarm. A current tire pressure alarm means the following: the detected tire pressure value is compared with a preset tire pressure value, and if the detected tire pressure value is less than the preset tire pressure value when a load remains unchanged, it may be considered that the tire pressure of the tire is insufficient, and an alarm is triggered for reminding. However, when the load of the vehicle increases, the tire is compressed under action of the load, and the tire pressure of the tire increases correspondingly. In this case, although the detected tire pressure value is greater than the preset tire pressure value, because the tire pressure in the tire is generated by deformation of the tire due to compression in this case, a load-bearing capacity of the tire does not increase correspondingly as the pressure increases. Therefore, there is a case in which the detected tire pressure value is greater than the preset tire pressure value due to an increase in the load of the vehicle, but the load-bearing capacity of the tire does not meet a requirement for use. For a vehicle, especially a vehicle fully loaded with passengers, there is a risk that a load-bearing capacity of a tire is insufficient due to insufficient tire pressure, but a tire pressure alarm cannot be triggered as an increased load.

SUMMARY

In view of the foregoing disadvantages of the conventional technology, an objective of the present disclosure is to provide a tire pressure alarm method and apparatus, a computer device, and a storage medium, to resolve a problem in the conventional technology that a tire pressure alarm cannot be triggered when tire pressure increases due to a load.

To achieve the foregoing objective and another related objective, the present disclosure provides a tire pressure alarm method, including:

obtaining a static load parameter and an actual tire pressure value of a tire;

determining a safe tire pressure value based on the static load parameter, the actual tire pressure value, and a preset mapping relationship between the static load parameter, the actual tire pressure value, and the safe tire pressure value; and comparing the actual tire pressure value with the safe tire pressure value, and emitting an alarm signal if the actual tire pressure value is less than the safe tire pressure value.

Optionally, the obtaining a static load parameter includes: scanning an inner cavity contour of the tire, where the static load parameter is determined based on a minimum size of the inner cavity contour in a radial direction of the tire.

Optionally, a distance between a tire axis and a ground is measured, and the static load parameter is determined based on the distance between the tire axis and the ground.

Optionally, the determining a safe tire pressure value based on the static load parameter, the actual tire pressure value, and a preset mapping relationship between the static load parameter, the actual tire pressure value, and the safe tire pressure value includes: determining a static load of the tire based on the actual tire pressure value, the static load parameter, and a preset mapping relationship between the static load parameter, the actual tire pressure value, and the static load; and determining the safe tire pressure value based on the static load, the actual tire pressure value, and a preset mapping relationship between the static load, the actual tire pressure value, and the safe tire pressure value.

The present disclosure further provides a tire pressure alarm apparatus, including:

a radius detection module, configured to obtain a static load parameter of a tire;

a tire pressure sensor, configured to obtain an actual tire pressure value of the tire a calculation and comparison module, connected to the radius detection module and the tire pressure sensor through a signal, where the calculation and comparison module determines a safe tire pressure value based on the static load parameter, the actual tire pressure value, and a preset mapping relationship between the static load parameter, the actual tire pressure value, and the safe tire pressure value, and compares the actual tire pressure value with the safe tire pressure value; and an alarm module, connected to the calculation and comparison module through a signal, where the alarm module emits an alarm signal if the actual tire pressure value is less than the safe tire pressure value.

Optionally, the radius detection module is a laser scanner or an ultrasonic detector, and the radius detection module detects an inner cavity of the tire to obtain an inner cavity contour of the tire, where the static load parameter is determined based on a minimum size of the inner cavity contour in a radial direction of the tire.

Optionally, the radius detection module is a rangefinder disposed on a wheel shaft, and the rangefinder is configured to measure a distance between a tire axis and a ground, where the static load parameter is determined based on the distance between the tire axis and the ground.

Optionally, the calculation and comparison module includes a first calculation unit and a second calculation unit. The first calculation unit obtains a static load of the tire through calculation based on the actual tire pressure value, the static load parameter, and a preset mapping relationship between the static load parameter, the actual tire pressure value, and the static load. The second calculation unit obtains the safe tire pressure value of the tire through calculation based on the static load, the actual tire pressure value, and a preset mapping relationship between the static load, the actual tire pressure value, and the safe tire pressure value.

The present disclosure further provides a computer device, including a memory, a processor, and a computer program that is stored in the memory and that is capable of running on the processor. The processor executes the computer program to implement the steps of the foregoing tire pressure alarm method.

The present disclosure further provides a computer-readable storage medium. The computer-readable storage medium stores a computer program. The computer program is executed by a processor to implement the steps of the foregoing tire pressure alarm method.

As described above, the tire pressure alarm method and apparatus, the computer device, and the storage medium in the present disclosure have the following beneficial effects: in the present disclosure, the static load parameter and the actual tire pressure value of the tire are obtained to determine the safe tire pressure value, and then the actual tire pressure value is compared with the safe tire pressure value. If the actual tire pressure value is less than the safe tire pressure value, an alarm signal is emitted to remind a driver to pay attention. As a load of the vehicle changes, the static load parameter of the tire changes correspondingly. Therefore, a load value of a whole vehicle may be obtained from the static load parameter of the tire. The safe tire pressure value may be correspondingly adjusted based on inherent mechanical properties of the tire and the static load parameter, to avoid a false alarm or an alarm failure caused when a load of the vehicle changes but the safe tire pressure value remains unchanged. In addition, the static load parameter is collected when a vehicle is in a stationary state, that is, collected before the vehicle starts, so that safety warning can be performed on tire pressure before driving of the vehicle, thereby ensuring vehicle safety.

DESCRIPTION OF EMBODIMENTS

Figure 1:
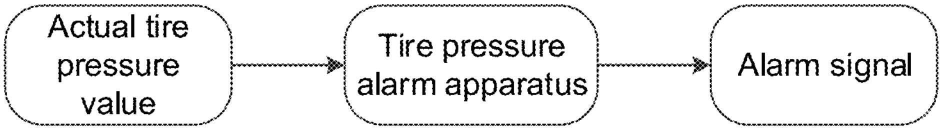
FIG. 1 is a schematic diagram of an application environment of a tire pressure alarm method according to an embodiment of the present disclosure.

The following describes implementations of the present disclosure by using some specific examples. A person skilled in the art can easily understand other advantages and effects of the present disclosure based on the content disclosed in this specification. The present disclosure may be further implemented or applied by using other different specific implementations. Various details in this specification may also be modified or altered based on different viewpoints and applications without departing from the present disclosure.

Refer to FIG. 1 to FIG. 5. It should be noted that the drawings provided in the embodiments merely describe the basic concept of the present disclosure by using examples. Although the drawings show only components related to the present disclosure, and are not drawn based on a quantity of components, a shape of a component, and a size of a component during actual implementation, a shape, a quantity, and a scale of the components may be arbitrarily changed during actual implementation, and a component layout form may be more complex. The structure, scale, size, and the like shown in the drawings of this specification are merely used to cooperate with the content disclosed in this specification for a person skilled in the art to understand and read, and are not restrictions for limiting implementation of the present disclosure, and therefore have no technically substantial significance. Any modification of the structure, change of a proportional relationship, or adjustment of the size shall still fall within the scope that can be covered by the technical content disclosed in the present disclosure, provided that they do not affect the efficacy that can be generated by the present disclosure and the purpose that can be achieved by the present disclosure. In addition, terms such as “upper”, “lower”, “left”, “right”, “middle”, and “one” that are referred in this specification are merely used for ease of description, and are not intended to limit the scope of implementation of the present disclosure. A change or an adjustment of a relative relationship thereof also falls within the scope of implementation of the present disclosure on the premise that the technical content is not substantially changed.

Before the embodiments of the present disclosure are described in detail, an application environment of the present disclosure is first described. As shown in FIG. 1, the technology in the present disclosure is mainly applied to a tire pressure alarm for a tire of a vehicle. A current tire pressure alarm means the following: a detected tire pressure value is compared with a preset tire pressure value, and if the detected tire pressure value is less than the preset tire pressure value when a load remains unchanged, it may be considered that tire pressure of the tire is insufficient, and an alarm is triggered for reminding. However, when the load of the vehicle increases, the tire is compressed under action of the load, and the tire pressure of the tire increases correspondingly. In this case, although the detected tire pressure value is greater than the preset tire pressure value, because the tire pressure in the tire is generated by deformation of the tire due to compression in this case, a load-bearing capacity of the tire does not increase correspondingly as the pressure increases. Therefore, there is a case in which the detected tire pressure value is greater than the preset tire pressure value due to an increase in the load of the vehicle, but the load-bearing capacity of the tire does not meet a requirement for use. For a vehicle, especially a vehicle fully loaded with passengers, there is a risk that a load-bearing capacity of a tire is insufficient due to insufficient tire pressure, but a tire pressure alarm cannot be triggered as an increased load.

Figure 2:
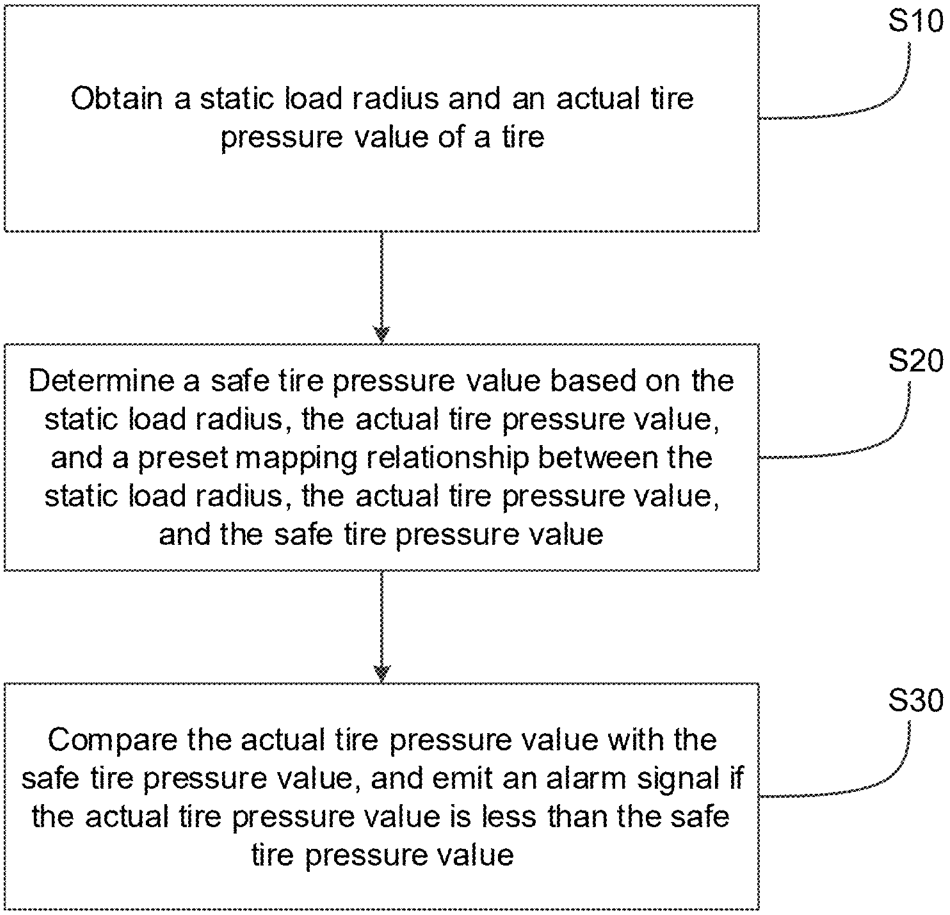
FIG. 2 is a flowchart of step S10 to step S30 in a tire pressure alarm method according to an embodiment of the present disclosure.

In view of this, referring to FIG. 2, in some embodiments, a tire pressure alarm method is provided, including the following steps:

- S10: Obtain a static load parameter and an actual tire pressure value of a tire;
- S20: Determine a safe tire pressure value based on the static load parameter, the actual tire pressure value, and a preset mapping relationship between the static load parameter, the actual tire pressure value, and the safe tire pressure value; and S30: Compare the actual tire pressure value with the safe tire pressure value, and emit an alarm signal if the actual tire pressure value is less than the safe tire pressure value.

In some embodiments, step S10, that is, the step of obtaining a static load parameter, includes the following substep:

S11: Obtain an inner cavity contour of the tire through scanning, where the static load parameter is determined based on a minimum size of the inner cavity contour in a radial direction of the tire.

In some embodiments, step S10, that is, the step of obtaining a static load parameter, includes the following substep:

S12: Measure a distance between a tire axis and a ground to obtain the static load parameter.

The static load parameter may be a static load diameter of the tire, or may be a static load radius of the tire, and may be properly selected based on an actual condition in a calculation process. When the static load parameter of the tire is determined by using the minimum size of the inner cavity contour in the radial direction of a wheel body, using the static load diameter of the tire as an example, a diameter of the tire is equal to the sum of a radial size of a wheel rim and a radial size of a tire body. The radial size of the tire body is equal to the sum of a thickness of a tire wall and a radial size of the inner cavity contour. For a general vehicle, both the radial size of the wheel rim and the thickness of the tire wall are known parameters. Therefore, after the minimum size of the inner cavity contour in the radial direction of the wheel body is obtained, the static load diameter of the tire may be obtained by summing up the minimum size of the inner cavity contour in the radial direction of the wheel body, the radial size of the wheel rim, and the thickness of the tire wall. When the static load parameter is determined by measuring the distance between the tire axis and the ground, the distance between the tire axis and the ground is the static load diameter of the tire.

In some embodiments, step S20, that is, the step of determining a safe tire pressure value based on the static load parameter, the actual tire pressure value, and a preset mapping relationship between the static load parameter, the actual tire pressure value, and the safe tire pressure value includes the following substeps:

S21: Determine a static load based on the actual tire pressure value, the static load parameter, and a preset mapping relationship between the static load parameter, the actual tire pressure value, and the static load.

S22: Determine the safe tire pressure value based on the static load, the actual tire pressure value, and a preset mapping relationship between the static load, the actual tire pressure value, and the safe tire pressure value.

Both the mapping relationship between the static load parameter, the actual tire pressure value, and the static load and the mapping relationship between the static load, the actual tire pressure value, and the safe tire pressure value may be obtained in a manner of fitting experimental data obtained through a limited quantity of experiments, or the like.

The present disclosure further provides a tire pressure alarm apparatus, including a radius detection module, a tire pressure sensor, a calculation and comparison module, and an alarm module. The radius detection module is configured to obtain a static load parameter of a tire, and the tire pressure sensor is configured to obtain an actual tire pressure value of the tire. The calculation and comparison module is connected to the radius detection module and the tire pressure sensor through a signal. The calculation and comparison module can determine a safe tire pressure value based on the static load parameter, the actual tire pressure value, and a preset mapping relationship between the static load parameter, the actual tire pressure value, and the safe tire pressure value, and compare the actual tire pressure value with the safe tire pressure value. The alarm module is connected to the calculation and comparison module through a signal, and the alarm module emits an alarm signal if the actual tire pressure value is less than the safe tire pressure value.

In some embodiments, the radius detection module is a laser scanner or an ultrasonic detector, and the radius detection module detects an inner cavity of the tire to obtain an inner cavity contour of the tire, where a minimum size of the inner cavity contour in a radial direction of the tire is the static load parameter. When a vehicle stops, the laser scanner or the ultrasonic detector performs imaging on the inner cavity of the tire to obtain the inner cavity contour of the tire. When a wheel is stationary, a minimum size in a radial direction of the wheel is the static load parameter of the tire.

In some other embodiments, the radius detection module is a rangefinder disposed on a wheel shaft, and the rangefinder is configured to measure a distance between a tire axis and a ground, where the distance between the tire axis and the ground is the static load parameter. When the wheel is stationary, the rangefinder measures the distance between the ground and the tire axis in a gravity direction, where the distance is the static load parameter. Specifically, the rangefinder rotates freely around an axis of the wheel and is disposed on the wheel shaft. Because the rangefinder can rotate freely, when the vehicle is stationary, the rangefinder always faces the ground under action of gravity, and the rangefinder measures a distance between the ground and the axis of the wheel, where the distance is the static load parameter.

Figure 3:
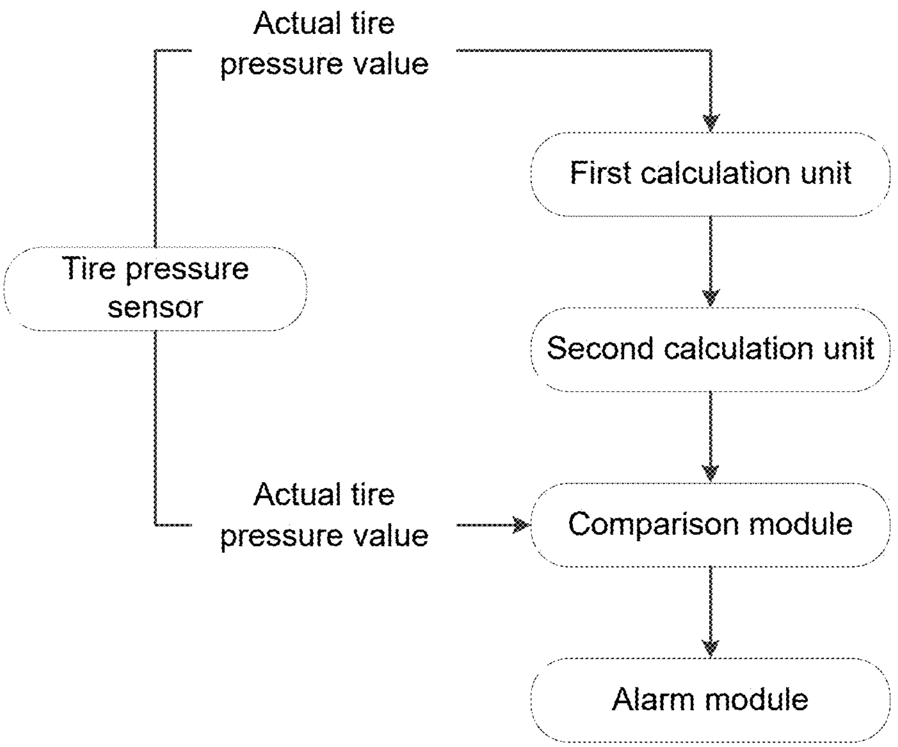
FIG. 3 is a schematic diagram of a structure of a tire pressure alarm apparatus according to an embodiment of the present disclosure.
Figure 4:
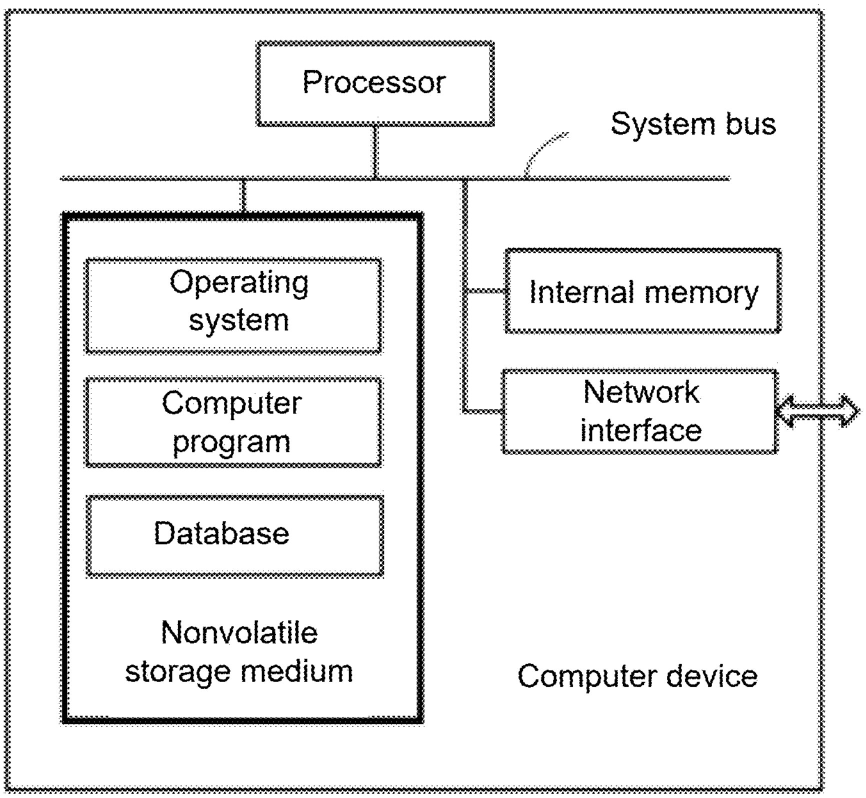
FIG. 4 is a first schematic diagram of a structure of a computer device according to an embodiment of the present disclosure.
Figure 5:
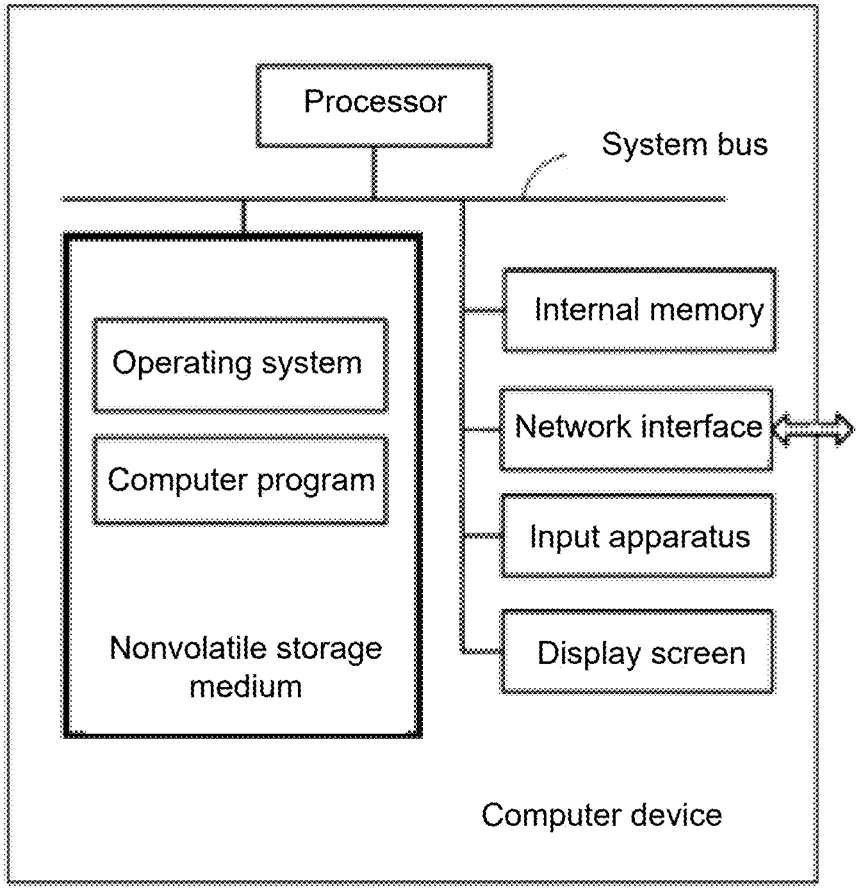
FIG. 5 is a second schematic diagram of a structure of a computer device according to an embodiment of the present disclosure.

As shown in FIG. 3, in some embodiments, the calculation and comparison module includes a first calculation unit and a second calculation unit. The first calculation unit is configured to obtain a static load of the tire through fitting based on a radial stiffness modulus of the tire, the static load parameter, and the actual tire pressure value. The second calculation unit obtains the safe tire pressure value of the tire through calculation based on the static load and the radial stiffness modulus. The radial stiffness modulus of the tire is an inherent property of the tire, and may be obtained in advance through an experiment or the like.

Specifically, in some embodiments, a first calculation formula related to the radial stiffness modulus, the static load parameter, the actual tire pressure value, and the static load is set in the first calculation unit. The static load may be obtained through calculation by using the first calculation formula when the radial stiffness modulus, the static load parameter, and the actual tire pressure value are known. The first calculation formula may be obtained by separately obtaining associated data between the radial stiffness modulus, the static load parameter, the actual tire pressure value, and the static load through a limited quantity of experiments, and then fitting the associated data.

A second calculation formula related to the static load, the radial stiffness modulus, and the safe tire pressure value is set in the second calculation unit. The safe tire pressure value may be obtained through calculation by using the second calculation formula when the static load and the radial stiffness modulus are known. The second calculation formula may also be obtained by obtaining associated data between the static load, the radial stiffness modulus, and the safe tire pressure value through a limited quantity of experiments, and then fitting the associated data.

In some other embodiments, a first model and a second model are established, and the first model and the second model are respectively trained by using a first training data set and a second training data set. The first training data set includes the radial stiffness modulus, the static load parameter, the actual tire pressure value, and the static load, and the second training quantity set includes the static load, the radial stiffness modulus, and the safe tire pressure value. The first training data set and the second training data set may be obtained through a limited quantity of experiments. A trained first model is set in the first unit, and a trained second model is set in the second unit. When the radial stiffness modulus, the static load parameter, and the actual tire pressure value of the tire are known, a corresponding static load may be obtained by using the trained first model. Then, a corresponding safe tire pressure value may be obtained based on the static load and the radial stiffness modulus by using the trained second model.

In some embodiments, the calculation and comparison module further includes a comparison module. The comparison module receives the safe tire pressure value obtained through calculation by the second calculation unit and the actual tire pressure value detected by the tire pressure sensor, and compares the actual tire pressure value with the safe tire pressure value. If the actual tire pressure value is less than the safe tire pressure value, the comparison module sends a comparison result to the alarm module, and the alarm module emits an alarm signal such as a sound, optics, or vibration, to remind a driver of insufficient tire pressure.

Because the static load parameter is collected when a vehicle is in a stationary state, that is, collected before the vehicle starts, safety warning can be performed on tire pressure before driving of the vehicle, thereby ensuring vehicle safety.

In some embodiments, a computer device is provided. The computer device may be a server, and a diagram of an internal structure of the computer device may be shown in FIG. 4. The computer device includes a processor, a memory, a network interface, and a database that are connected by using a system bus. The processor of the computer device is configured to provide computing and control capabilities. The memory of the computer device includes a nonvolatile storage medium and/or a volatile storage medium and an internal memory. The nonvolatile storage medium stores an operating system, a computer program, and a database. The internal memory provides an environment for running the operating system and the computer program in the nonvolatile storage medium. The network interface of the computer device is configured to communicate with an external client interface through a network connection. The computer program is executed by the processor to implement functions or steps of the tire pressure alarm method on a server side.

In an embodiment, a computer device is provided. The computer device may be a client, and a diagram of an internal structure of the computer device may be shown in FIG. 5. The computer device includes a processor, a memory, a network interface, a display screen, and an input apparatus that are connected by using a system bus. The processor of the computer device is configured to provide computing and control capabilities. The memory of the computer device includes a nonvolatile storage medium and an internal memory. The nonvolatile storage medium stores an operating system and a computer program. The internal memory provides an environment for running the operating system and the computer program in the nonvolatile storage medium. The network interface of the computer device is configured to communicate with an external server through a network connection. The computer program is executed by the processor to implement functions or steps of the tire pressure alarm method on a client side.

The present disclosure further provides a computer-readable storage medium. The computer-readable storage medium stores a computer program. The computer program is executed by a processor to implement the steps of the foregoing tire pressure alarm method.

It should be noted that, for the foregoing functions or steps that can be implemented by the computer-readable storage medium or the computer device, reference may be correspondingly made to related descriptions of the server side and the client side in the foregoing method embodiments. To avoid repetition, details are not described herein again.

A person of ordinary skill in the art may understand that all or some of the procedures of the methods in the foregoing embodiments may be implemented by a computer program instructing related hardware. The computer program may be stored in a nonvolatile computer-readable storage medium. When the computer program is executed, the procedures in the foregoing method embodiments may be included. Any reference to a memory, a storage, a database, or another medium used in the embodiments provided in the present application may include a nonvolatile memory and/or a volatile memory. The nonvolatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. As an illustration rather than a limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and rambus dynamic RAM (RDRAM).

In conclusion, according to the tire pressure alarm method and apparatus, the computer device, and the storage medium in the present disclosure, the static load parameter and the actual tire pressure value of the tire are obtained to determine the safe tire pressure value, and then the actual tire pressure value is compared with the safe tire pressure value. If the actual tire pressure value is less than the safe tire pressure value, an alarm signal is emitted to remind a driver to pay attention. As a load of the vehicle changes, the static load parameter of the tire changes correspondingly. Therefore, a load value of a whole vehicle may be obtained from the static load parameter of the tire. The safe tire pressure value may be correspondingly adjusted based on inherent mechanical properties of the tire and the static load parameter, to avoid a false alarm or an alarm failure caused when a load of the vehicle changes but the safe tire pressure value remains unchanged. In addition, the static load parameter is collected when a vehicle is in a stationary state, that is, collected before the vehicle starts, so that safety warning can be performed on tire pressure before driving of the vehicle, thereby avoiding a delay in warning caused by tire pressure warning during driving and safety risks caused by the delay in warning.

The foregoing embodiments merely illustrate principles and effects of the present disclosure, but are not intended to limit the present disclosure. Any person skilled in the art may modify or alter the foregoing embodiments without departing from the spirit and scope of the present disclosure. Therefore, all equivalent modifications or alterations completed by a person of ordinary skill in the art without departing from the spirit and technical ideas disclosed in the present disclosure should still be covered by the claims of the present disclosure.

What is claimed is:

1. A tire pressure alarm method, comprising:

obtaining, under different load conditions of a tire of a vehicle, multiple first data sets of the tire through experimental measurements, each first data set comprising a radial stiffness modulus, a static load parameter, an actual tire pressure value, and a static load of the tire respectively, and fitting the first data sets to obtain a first calculation formula of the radial stiffness modulus, the static load parameter, the actual tire pressure value, and the static load, wherein the static load parameter is a diameter of the tire or a radius of the tire of the vehicle directly measured when the vehicle is stationary and loaded; the radial stiffness modulus of the tire is an inherent property of the tire and is obtained in advance;

obtaining, under different load conditions of the tire of the vehicle, multiple second data sets of the tire through experimental measurements, each second data set comprising the radial stiffness modulus, the static load, and a safe tire pressure value of the tire respectively, and fitting the second data sets to obtain a second calculation formula of the radial stiffness modulus, the static load, and the safe tire pressure value;

obtaining a current static load parameter of the tire when the vehicle is stationary and loaded and obtaining a current radial stiffness modulus and a current actual tire pressure value of the tire;

substituting the current radial stiffness modulus, the current static load parameter, and the current actual tire pressure value into the first calculation formula to calculate a current static load of the tire;

then substituting the current radial stiffness modulus and the current static load into the second calculation formula to calculate a current safe tire pressure value of the tire; and comparing the current actual tire pressure value with the current safe tire pressure value, and emitting an alarm signal if the current actual tire pressure value is less than the current safe tire pressure value.

2. The tire pressure alarm method according to claim 1, wherein obtaining the static load parameter comprises: scanning an inner cavity contour of the tire, wherein the static load parameter is determined based on a minimum size of the inner cavity contour in a radial direction of the tire.

3. The tire pressure alarm method according to claim 1, wherein obtaining the static load parameter comprises: measuring a distance between a tire axis and a ground, wherein the static load parameter is determined based on the distance between the tire axis and the ground.

4. A tire pressure alarm apparatus, comprising:

a radius detection module, configured to obtain a static load parameter of a tire; wherein the static load parameter is a diameter of the tire or a radius of the tire of a vehicle directly measured when the vehicle is stationary and loaded, a radial stiffness modulus of the tire is an inherent property of the tire and is obtained in advance;

a tire pressure sensor, configured to obtain an actual tire pressure value of the tire;

a calculation and comparison module, connected to the radius detection module and the tire pressure sensor through a signal, wherein the calculation and comparison module comprises a first calculation unit and a second calculation unit, the first calculation unit is configured with a first calculation formula of the radial stiffness modulus, the static load parameter, the actual tire pressure value, and the static load, and configured to obtain the static load of the tire through calculation based on the radial stiffness modulus, the actual tire pressure value, the static load parameter, and the first calculation formula, the second calculation unit is configured with a second calculation formula of the radial stiffness modulus, the static load, and the safe tire pressure value, and configured to obtain the safe tire pressure value of the tire through calculation based on the static load, the actual tire pressure value, and the second calculation formula; and an alarm module, connected to the calculation and comparison module through a signal, wherein the alarm module is configured to emit an alarm signal if the actual tire pressure value is less than the safe tire pressure value.

5. The tire pressure alarm apparatus according to claim 4, wherein the radius detection module is a laser scanner or an ultrasonic detector, and the radius detection module is configured to detect an inner cavity of the tire to obtain an inner cavity contour of the tire, wherein the static load parameter is determined based on a minimum size of the inner cavity contour in a radial direction of the tire.

6. The tire pressure alarm apparatus according to claim 4, wherein the radius detection module is a rangefinder disposed on a wheel shaft, and the rangefinder is configured to measure a distance between a tire axis and a ground, wherein the static load parameter is determined based on the distance between the tire axis and the ground.

7. A computer device, comprising a memory, a processor, and a computer program that is stored in the memory and that is capable of running on the processor, wherein the processor executes the computer program to implement the tire pressure alarm method according to claim 1.

8. A non-transitory computer-readable storage medium, wherein the computer-readable storage medium stores a computer program, and the computer program is executed by a processor to implement the tire pressure alarm method according to claim 1.

* * * * *